US009356457B2

United States Patent
Sedzin et al.

(10) Patent No.: US 9,356,457 B2
(45) Date of Patent: May 31, 2016

(54) WIRELESS CHARGING USING PASSIVE NFC TAG AND MULTIPLE ANTENNA OF DIFFERING SHAPES

(71) Applicant: NXP B. V., Eindhoven (NL)

(72) Inventors: Aliaksei Vladimirovich Sedzin, Eindhoven (NL); Johannes Petrus Maria van Lammeren, Beuningen (NL); Klaas Brink, Waalre (NL)

(73) Assignee: NXP B.V., Eindhoven (NL)

( * ) Notice: Subject to any disclaimer, the term of this patent is extended or adjusted under 35 U.S.C. 154(b) by 443 days.

(21) Appl. No.: 13/722,008

(22) Filed: Dec. 20, 2012

(65) Prior Publication Data
US 2014/0176056 A1   Jun. 26, 2014

(51) Int. Cl.
*H02J 7/00* (2006.01)
*H01F 38/14* (2006.01)
*H02J 7/02* (2016.01)

(52) U.S. Cl.
CPC .............. *H02J 7/0052* (2013.01); *H01F 38/14* (2013.01); *H02J 7/025* (2013.01); *Y02T 10/7005* (2013.01); *Y02T 90/16* (2013.01)

(58) Field of Classification Search
CPC ........... H02J 7/0052; H02J 7/00; H02J 7/025; H01F 38/14
USPC ................................................. 320/107–108
See application file for complete search history.

(56) References Cited

U.S. PATENT DOCUMENTS

| | | | |
|---|---|---|---|
| 8,212,518 B2 | 7/2012 | Pijnenburg et al. | |
| 2009/0096413 A1* | 4/2009 | Partovi et al. | 320/108 |
| 2010/0041332 A1* | 2/2010 | Flygh | G06F 1/1632 455/41.1 |
| 2012/0306433 A1* | 12/2012 | Kim et al. | 320/106 |
| 2013/0015813 A1* | 1/2013 | Kim et al. | 320/108 |
| 2013/0082651 A1* | 4/2013 | Park et al. | 320/108 |
| 2013/0099733 A1* | 4/2013 | Park et al. | 320/108 |
| 2013/0109306 A1* | 5/2013 | Savoj | G06K 7/10237 455/41.1 |
| 2013/0127404 A1* | 5/2013 | Maenpaa | 320/108 |
| 2013/0154558 A1* | 6/2013 | Lee et al. | 320/108 |
| 2013/0307468 A1* | 11/2013 | Lee et al. | 320/108 |
| 2013/0311798 A1* | 11/2013 | Sultenfuss | H04B 5/0037 713/310 |
| 2014/0002014 A1* | 1/2014 | Sultenfuss et al. | 320/108 |
| 2014/0103873 A1* | 4/2014 | Partovi | H02J 7/0027 320/108 |
| 2014/0117921 A1* | 5/2014 | Suomela | 320/103 |
| 2015/0053773 A1* | 2/2015 | Hsu | G06K 7/10356 235/492 |

FOREIGN PATENT DOCUMENTS

| | | |
|---|---|---|
| CN | 102130514 A | 7/2011 |
| CN | 102611213 A | 7/2012 |
| JP | 2010068185 A | 3/2010 |

* cited by examiner

*Primary Examiner* — Stacy Whitmore

(57) ABSTRACT

A charging pad capable of charging a receiver according to a predetermined procedure is disclosed. The charging pad may have a plurality of charging coils and a controller for selecting an appropriate coil for charging the receiver. The receiver communicates with the charging pad via NFC, thereby indicating to the charging pad the appropriate procedure for charging the receiver. The controller then selects the appropriate coil and directs charging according to the appropriate procedure.

14 Claims, 1 Drawing Sheet

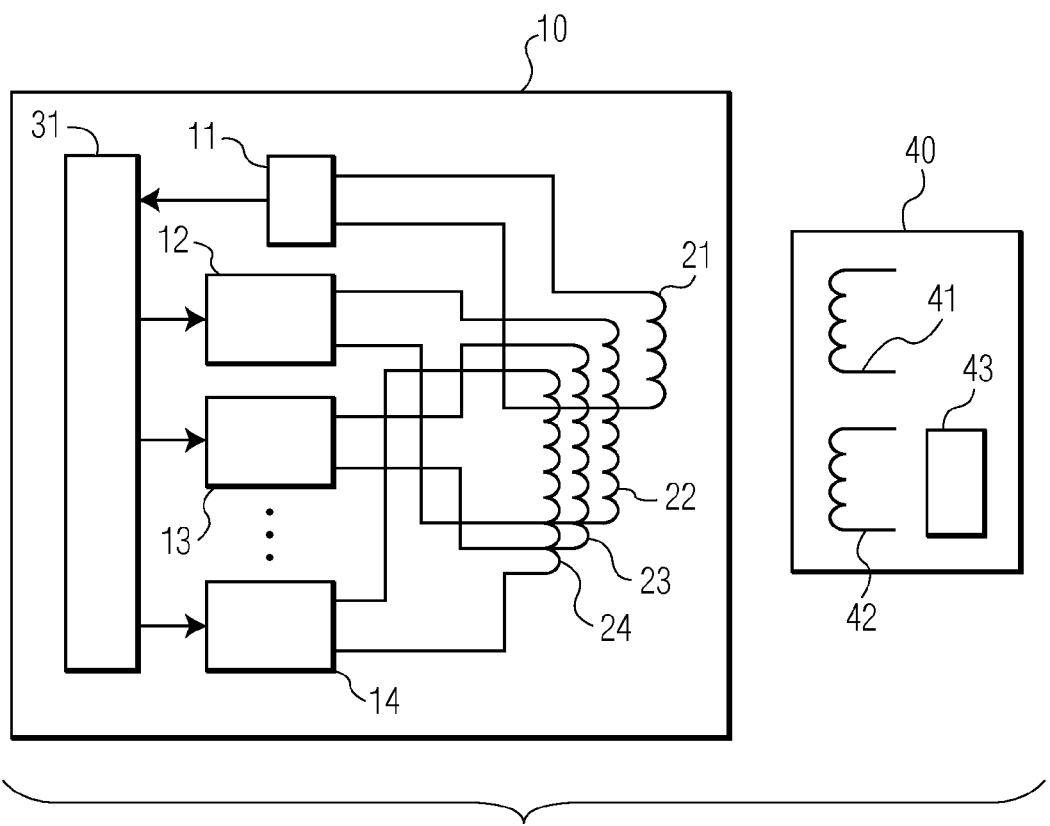

WIRELESS CHARGING USING PASSIVE NFC TAG AND MULTIPLE ANTENNA OF DIFFERING SHAPES

FIELD OF THE INVENTION

This invention generally relates to a method and apparatus for wirelessly charging a variety of equipments or devices, each of which may require charging according to different standards or procedures.

BACKGROUND OF THE INVENTION

Many equipments or devices, including, for example, mobile phones and electronic equipment, to name but a few, contain rechargeable batteries. An increasingly popular method of recharging such rechargeable batteries is wireless or inductive charging. An example of the use of wireless charging is provided in U.S. Pat. No. 8,212,518. It is common to refer to the charging apparatus as the "transmitter" or "charging pad" or "pad" and to the device or equipment being charged as the "receiver".

Unfortunately, there are different standards and procedures for charging electronic equipments or devices. Consequently, effective charging can only be accomplished when the electronic equipment or device is matched with a charger that charges according to the standard or procedure specified by the maker of the equipment or device. For example, various standards may differ in the principles of power transfer, frequencies used, presence of device detection, and communication protocols.

SUMMARY OF THE INVENTION

A charging pad for charging various receivers each of which may require charging according to a different procedure or standard is disclosed. Also, a method of charging a receiver which may require charging according to a predetermined procedure is disclosed. In more particular, a method of charging a receiver by a charging pad, the receiver having NFC functionality and being capable of being charged according to a predetermined procedure, and the charging pad being capable of charging according to any of a plurality of different procedures is disclosed. This method includes: transmitting via NFC information from the receiver to the charging pad about the predetermined procedure, causing the charging pad to charge the receiver according to the predetermined procedure. Further, the method may include a charging pad having a plurality of charging coils; the use of a controller capable of choosing at one of the charging coils for charging according to the predetermined procedure and the use of at least one transmitter connected to at least one charging coil. In one embodiment, the charging pad includes an NFC tag for receiving information about the receiver.

Further contemplated is a charging pad having an NFC tag, the tag being capable of receiving information from a receiver and a plurality of charging coils. Such charging pad may have a plurality of charging coils and may have a controller for receiving information from the tag and selecting at least one of the charging coils for charging the receiver. The charging pad may have at least one transmitter connected to at least one of the charging coils.

BRIEF DESCRIPTION OF THE DRAWINGS

FIG. 1 is a circuit diagram of an illustrative embodiment of the invention.

DETAILED DESCRIPTION OF EXEMPLARY EMBODIMENTS

In an illustrative embodiment the present invention provides a transmitter 10 with a plurality of charging coils 22, 23, and 24. Each coil may be of a different shape and configuration so that it is adapted to facilitate charging according to at least one standard or procedure that is different in some respect from the standard or procedure that is associated with another coil.

Coil 22 is connected directly or indirectly to transmitter 12; coil 23 is connected directly or indirectly to transmitter 13; and coil 24 is connected directly or indirectly to transmitter 14. A greater or lesser number of coils and transmitters is possible.

Reference numeral 21 denotes a Near Field Communication (NFC) antenna. NFC typically involves transmission centered at 13.56 MHz. NFC applications may utilize two antennas, one antenna located upon an initiator, and the other located upon a target. The initiator may generate an RF field that can power a passive target (which is sometimes a tag). In the present embodiment, NFC antenna 21 is connected to passive NFC tag 11.

Reference number 31 denotes a controller which is capable of receiving information from the passive NFC tag 11 and also providing control for transmitters 12, 13, and 14. Controller 31 may, for example, control the power transfer characteristics, frequencies, and other charging parameters of transmitters 12, 13, and 14.

In operation, an equipment or device (i.e. receiver) 40 requiring charging according to a particular standard, for example "standard X" is brought into proximity or contact with transmitter 10. In many applications, receiver 40 is placed upon transmitter 10 which has the external shape of a pad—and is often called a "pad". Receiver 40 contains a battery 43; and an antenna 41 which is capable of transmitting a "charge me according to standard X" command via NFC; and coil 42 which is capable of absorbing electromagnetic energy and delivering it via circuitry not shown to battery 43, thereby facilitating recharging of battery 43.

Thus, receiver 40 transmits a "charge me according to standard X" command which is received by tag 11. The command is transmitted via tag 11 to controller 31 which determines if it has been configured or programmed to provide charging according to standard X. If controller 31 has been configured or programmed to provide charging according to standard X, it then provides charging direction to one or more of transmitters 12, 13, or 14 so that charging is accomplished according to standard X. If controller 31 has not been configured or programmed to provide charging according to standard X, it may provide such information to the user via a signal on pad 10 or a signal transmitted to receiver 40.

Pad 10 may be in deep sleep mode or even turned off completely. Then when pad 10 receives the "charge me according to Standard X" command, it may be turned on and controller 31 may direct the charging as described above.

Various exemplary embodiments are described in reference to specific illustrative examples. The illustrative examples are selected to assist a person of ordinary skill in the art to form a clear understanding of, and to practice the various embodiments. However, the scope of systems, structures and devices that may be constructed to have one or more of the embodiments, and the scope of methods that may be implemented according to one or more of the embodiments, are in no way confined to the specific illustrative examples that have been presented. On the contrary, as will be readily recognized by persons of ordinary skill in the relevant arts based on this description, many other configurations, arrangements, and methods according to the various embodiments may be implemented.

The present invention has been described with respect to particular embodiments and with reference to certain drawings, but the invention is not limited thereto, but rather, is set forth only by the claims. The drawings described are only schematic and are non-limiting. In the drawings, for illustrative purposes, the size of various elements may be exaggerated and not drawn to a particular scale. It is intended that this invention encompasses inconsequential variations in the relevant tolerances and properties of components and modes of operation thereof. Imperfect practice of the invention is intended to be covered.

Where the term "comprising" is used in the present description and claims, it does not exclude other elements or steps. Where an indefinite or definite article is used when referring to a singular noun, e.g. "a" "an" or "the", this includes a plural of that noun unless something otherwise is specifically stated. Hence, the term "comprising" should not be interpreted as being restricted to the items listed thereafter; it does not exclude other elements or steps, and so the scope of the expression "a device comprising items A and B" should not be limited to devices consisting only of components A and B. This expression signifies that, with respect to the present invention, the only relevant components of the device are A and B.

What is claimed is:

1. A method of charging a rechargeable battery of a receiver by a charging pad, said receiver having NFC functionality and being capable of being charged according to a predetermined battery charging standard, said method comprising:
   receiving, via Near Field Communication (NFC), information from said receiver at a passive NFC tag of said charging pad about said predetermined battery charging standard; and
   in response to receiving said information at the passive NFC tag of the charging pad, causing said charging pad to charge the rechargeable battery of said receiver according to said predetermined battery charging standard;
   wherein said charging pad has at least two charging coils, one of the at least two charging coils being configured to facilitate charging of a rechargeable battery according to a first battery charging standard and a different one of the at least two charging coils being configured to facilitate charging of a rechargeable battery according to a second battery charging standard, wherein the first battery charging standard is different from the second battery charging standard; and
   wherein causing said charging pad to charge the rechargeable battery of said receiver according to said predetermined battery charging standard comprises choosing at least one of said at least two charging coils for charging the rechargeable battery of the receiver according to said predetermined battery charging standard.

2. The method of claim 1 in which said charging coil which is chosen has an associated transmitter for providing charging energy.

3. The method of claim 1 wherein the charging pad is in a deep sleep mode before receiving the command at the passive NFC tag.

4. The method of claim 3 further comprising turning on the charging pad in response to receiving the information at the passive NFC tag.

5. The method of claim 1 wherein the charging pad is turned off before receiving the command at the passive NFC tag.

6. The method of claim 5 further comprising turning on the charging pad in response to receiving the information at the passive NFC tag.

7. A charging pad comprising:
   a passive NFC tag; said passive NFC tag being capable of receiving information about a battery charging standard from a receiver;
   at least two charging coils, one of the at least two charging coils being configured to facilitate charging according to a first battery charging standard and a different one of the at least two charging coils being configured to facilitate charging according to a second battery charging standard, wherein the first battery charging standard is different from the second battery charging standard;
   a controller for receiving said information from said passive NFC tag and selecting at least one of said two charging coils for charging a rechargeable battery of said receiver in response to said information about a battery charging standard.

8. The charging pad of claim 7 further including at least one transmitter connected to at least one of said charging coils.

9. The charging pad of claim 7 wherein the at least to charging coils have different shapes.

10. A method of charging a rechargeable battery of a receiver by a charging pad, said receiver having NFC functionality and being capable of being charged according to a predetermined battery charging standard, said method comprising:
    receiving, via Near Field Communication (NFC), a command from said receiver at a passive NFC tag of said charging pad, the command requesting charging according to the predetermined battery charging standard;
    in response to receiving said command at the passive NFC tag of the charging pad, turning on the charging pad and causing said charging pad to charge the rechargeable battery of said receiver according to said predetermined battery charging standard;
    wherein said charging pad has at least two charging coils, one of the at least two charging coils being configured to facilitate charging of a rechargeable battery according to a first battery charging standard and a different one of the at least two charging coils being configured to facilitate charging of a rechargeable battery according to a second battery charging standard, wherein the first battery charging standard is different from the second battery charging standard; and
    wherein causing said charging pad to charge the rechargeable battery of said receiver according to said predetermined battery charging standard comprises choosing at least one of said at least two charging coils for charging the rechargeable battery of the receiver according to said predetermined battery charging standard.

11. The method of claim 10 wherein the charging pad is in a deep sleep mode before receiving the command at the passive NFC tag.

12. The method of claim 10 wherein the charging pad is turned off before receiving the command at the passive NFC tag.

13. The method of claim 10 in which said charging pad has a plurality of charging coils and a controller receptive to said information; said controller choosing at least one of said charging coils for charging according to said predetermined procedure.

14. The method of claim 10 in which said charging coil which is chosen by said controller has an associated transmitter for providing charging energy.

\* \* \* \* \*